April 19, 1960  D. E. BRANDT, JR  2,932,945
WEATHERCOCKING SUPERSONIC DIFFUSER
Filed April 16, 1957  2 Sheets-Sheet 1

INVENTOR
DAVID E. BRANDT, JR.
BY
AGENT

April 19, 1960  D. E. BRANDT, JR  2,932,945
WEATHERCOCKING SUPERSONIC DIFFUSER
Filed April 16, 1957  2 Sheets-Sheet 2

INVENTOR
DAVID E. BRANDT, JR.
BY
AGENT

United States Patent Office
2,932,945
Patented Apr. 19, 1960

2,932,945
WEATHERCOCKING SUPERSONIC DIFFUSER

David E. Brandt, Jr., Overland Park, Kans., assignor to Westinghouse Electric Corporation, East Pittsburgh, Pa., a corporation of Pennsylvania Application April 16, 1957, Serial No. 653,173

8 Claims. (Cl. 60—35.6)

This invention relates to aircraft jet propulsion engines, more particularly to an air inlet structure therefor and has for an object to provide an air inlet structure having improved performance characteristics.

In current aircraft jet propulsion engines capable of flight at supersonic speeds, the air inlet structure is provided with a centrally disposed core or spike extending forwardly of the annular air inlet lip to reflect the shock wave of the incoming air against the lip. For maximum efficiency, as well known in the art, the spike member is translatable axially in order to anchor the shock wave from the point of the spike to the air inlet lip regardless of variation in flight velocity of the engine.

Although the above described air inlet structure is highly efficient during normal straight line flight, i.e., flight in which the attitude of the engine is in fixed alignment with the direction of flow of incoming air, its efficiency drops abruptly during turning, diving or climbing maneuvers, because of the change in attitude of the engine relative to the direction of flow of the incoming air. This deviation in attitude of the engine is known as the angle of attack and may be more specifically defined as the acute angle formed by the axis of the air inlet of the engine and the direction of forward movement of the engine through the air. The forward movement of the engine creates a relative air current flowing in a direction opposite to movement of the engine. Hence during straight line flight the angle of attack is zero, since the air currents enter the air inlet in axial courses. However, during turning, climbing and diving maneuvers the air currents enter the air inlet at an acute angle (angle of attack) to the axis of the air inlet. During such conditions a portion of the shock wave reflected by the spike is formed in front of the inlet lip and allows air to spill out of the inlet. At the same time the remaining portion of the shock wave forms inside the inlet lip. Both of the above effects decrease the efficiency of the air inlet structure and prevent the engine from operating at maximum efficiency.

In view of the above, it is a further object of the invention to provide an air inlet structure which performs at maximum efficiency regardless of the angle of attack of the engine.

A more specific object is to provide an air inlet structure which is movably connected to the engine and arranged in a manner to maintain a zero angle of attack for the entering air regardless of the angle of attack of the engine.

The foregoing and other objects are effected by the invention as will be apparent from the following description and claims taken in connection with the accompanying drawings, forming a part of this application, in which:

Figure 1:
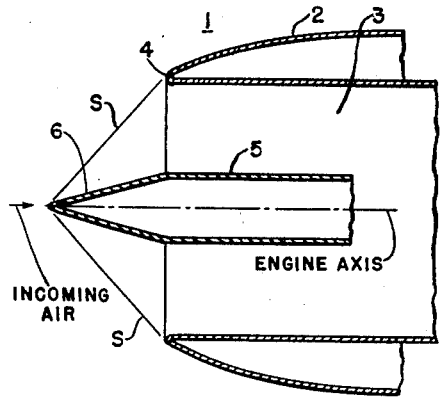
Fig. 1 is an axial sectional view illustrating conditions encountered in flight with a typical prior art air inlet structure for an aircraft jet propulsion engine when the angle of attack of the engine is zero.
Figure 2:
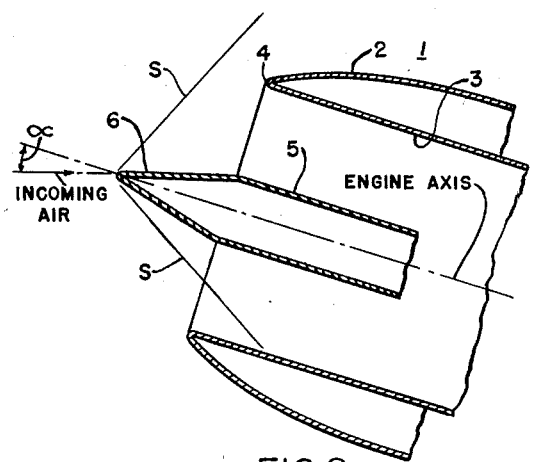
Fig. 2 is a view similar to Fig. 1 but illustrating conditions encountered in flight when the angle of attack of the engine is a substantial value.

Referring to Figs. 1 and 2, there is shown a prior art air inlet structure 1 for an aviation engine (not shown) comprising a double walled tubular casing 2 defining a central air passageway 3 for delivering incoming air to the engine and having an annular air intake lip portion 4. A centrally disposed core member 5 is further supported in the casing 2 in any desired manner (not shown) and provided with a pointed spike or substantially conical converging portion 6 extending forwardly of the air intake lip portion 4. Suitable means (not shown) may be employed for translating the spike portion 6 in axial direction.

As illustrated in Fig. 1, when the engine is flying in a straight line, so that its angle of attack with the incoming air is zero, the conically shaped supersonic shock wave S, S formed by the spike member 6 is anchored at the upstream edge of the air intake lip member 4, thereby permitting the air inlet structure 1 to perform at maximum air intake efficiency, as well known in the art.

However, as illustrated in Fig. 2, when the attitude of the engine is altered relative to the flight direction of the engine, so that the axis of the engine forms an acute angle $\alpha$ with the direction of incoming air, the conical supersonic shock wave S, S formed by the spike member 6 is shifted angularly with relation to the air intake lip 4 so that a segment of the shock wave S, S (for example that segment shown in the lower half of the figure) is anchored within the air inlet structure creating turbulence losses therein, while the upper segment of the shock wave extends forwardly of the air intake lip 4 as illustrated in the upper half of the figure, thereby allowing some of the air to spill out of the air intake lip 4 and further adding to the losses in efficiency of the air inlet structure.

Figure 3:
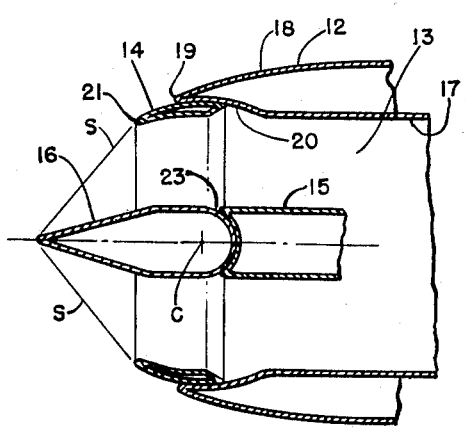
Fig. 3 is a schematic axial sectional view of an improved air inlet structure illustrating the generic concepts of the invention.
Figure 4:
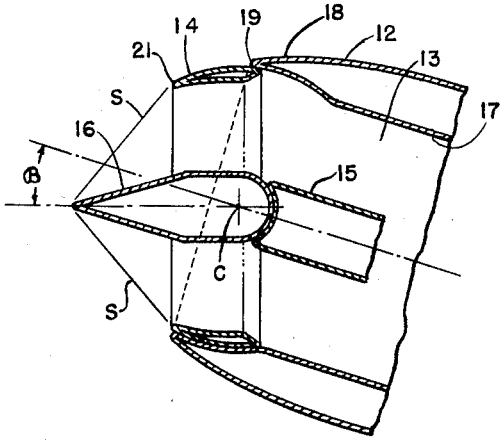
Fig. 4 is a view similar to Fig. 3 but showing the air inlet structure during flight conditions when the angle of attack of the engine is a substantial value.

In accordance with the broad concepts of the invention, there is shown diagrammatically in Figs. 3 and 4 an air inlet structure having a tubular casing member 12 defining a central air passageway 13 for delivering incoming air to the engine (not shown) and having an annular air intake lip member 14 disposed adjacent the forward peripheral edge portion of the casing 12. A centrally disposed core member 15 is further supported in the casing 12 in any desired manner (not shown) and provided with a spike or forwardly converging member 16 extending forwardly of the air intake lip member 14. The casing member 12 is of the double walled type having an inner tubular wall 17 and an outer tubular wall 18 connected to each other at their upstream edges 19. The inner wall 17 is further provided with a concave spherical surface portion 20 having its circumscribing center C at the axis of the air inlet structure. The air intake lip member 14 has a peripheral marginal portion 21 extending forwardly of the upstream edge portion 19 of the casing member and is formed with an outer convex spherical surface portion complementary to and received within the spherical surface 20 for slidable movement therein. Thus, the air intake lip member 14 is movable angularly relative to the axis of the casing 12 with a universal motion.

The spike member 16 is movably connected to the central core member 15 in a manner preferably similar to the lip member 14. Accordingly, it may be provided with a spherical surface 23 which is slidably received in a complementary spherical concavity of like radius provided in the member 15. The above spherical surfaces have their centers C on the axis of the casing 12. Hence, the spike member 16 is movable angularly relative to the axis of the casing 12 with a universal motion.

Since the structure shown in Figs. 3 and 4 is schematic and has been shown to illustrate the broad concept of the invention, means for moving the intake lip member 14 and means for moving the spike member 16 have not been shown. Suitable means may assume various forms, several of which are shown and described in conjunction with the subsequent embodiments.

The air inlet structure serves to obviate the efficiency losses of the prior art illustrated diagrammatically in Fig. 2.

During normal straight line flight when the attitude of the engine is such that the angle of attack formed by the axis of the engine with the direction of the incoming air is zero, the spike member 16 is disposed in its axially aligned position as illustrated in Fig. 3, so that the supersonic shock wave S, S formed thereby is symmetrical relative to the axis of the engine. The air intake lip member 14 is disposed in a position normal to the axis of the engine, so that the shock wave S, S formed by the spike member 16 is anchored at the peripheral upstream edge portion 21 of the lip member 14. Hence, under the above conditions the efficiency of the air inlet structure 11 attains the optimum value.

During a diving or turning maneuver, wherein the attitude of the engine is altered relative to the direction of flight of the engine, so that the angle of attack of the incoming air with the axis of the engine attains a value β, the air intake lip member 14 and the spike member 16 are moved about their common center C by suitable means (not shown) from their normal position shown in Fig. 3 to the position shown in Fig. 4. In this position the spike member 16 is disposed in alignment with the flow of incoming air and the air intake lip member 14 is disposed normal to the direction of incoming air. The supersonic shock wave S, S formed by the spike member 16 is thus anchored to the entire peripheral edge portion 21 of the air intake lip member 14, thereby obviating air intake losses and permitting the air to initially enter the air inlet structure in axial courses. After the air is received in the air inlet structure it is directed axially through the passageway 13 into the engine in the usual manner.

Figures 5, 6:
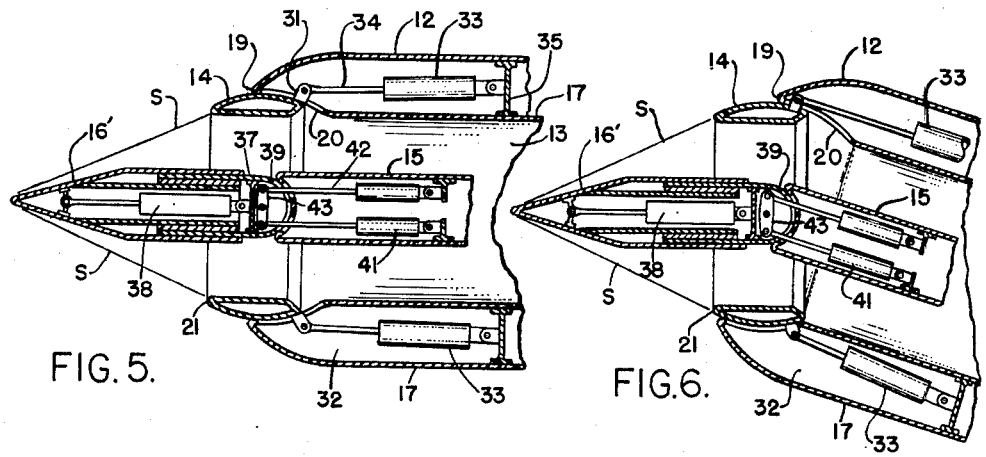
Figs. 5 and 6 are views similar to Figs. 3 and 4 but showing another embodiment of the invention.

In Figs. 5 and 6 there is shown an air inlet structure similar to that shown in Figs. 3 and 4, but illustrated in more detail. As described in conjunction with Figs. 3 and 4, the double walled tubular casing 12 defines the central air passageway 13 and has a forwardly disposed annular edge 19. The annular air intake lip member 14 is received in the concave spherical surface portion 20 of the inner wall member 17 for slidable movement relative thereto. The intake lip member 14 is provided with a series of lugs 31, spaced 90° from each other, each of which protrudes through an associated slot formed in the spherical surface 20. The inner and outer wall members 17 and 18 define an annular chamber 32 within which are received four actuators 33 of the reciprocating type having an actuating rod 34. Each of the actuators 33 is attached at one end to an annular bulkhead member 35 forming a part of the casing 12 and has its rod member 34 pivotally attached to its associated lug 31. (The preferred location of the actuators 33 has been indicated schematically in Fig. 7.)

Figures 7, 8:
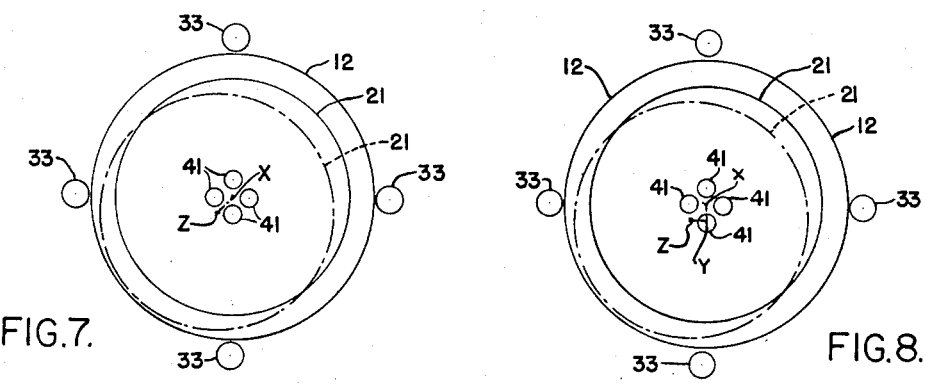
Figs. 7 and 8 are diagrammatic views illustrating different modes of operation of the embodiment shown in Figs. 5 and 6.

The centrally disposed core member 15 is further supported within the casing 12 in any suitable manner (not shown) and is provided with an extensible spike member 16'. The spike member 16' in this instance is slidably mounted upon a tubular guide member 37 and is movable axially relative thereto by means of a reciprocating actuator 38 disposed within the tubular guide member. The tubular member 37 is provided with a convex spherical surface 39 received in mating engagement with a spherical concave surface portion formed at the forward end of the core member 15. Within the core member 15 there are provided four actuators 41 of the reciprocating type. The actuators 41 are disposed in radial alignment with the actuators 33, as best seen in Fig. 7, and serve to position the spike member 16' angularly relative to the core member 15. Accordingly, the actuators 41 have their actuating rods 42 extending through suitable slots formed in the mating spherical surfaces and connected to a centrally mounted link member 43 within the tubular guide member 37.

The air inlet structure shown in Figs. 5 and 6 operates as follows. When the engine is in normal flight so that its angle of attack as heretofore defined is zero, the air inlet structure has the air intake lip member 14 and the spike member 16' positioned as shown in Fig. 5. However, when the engine is employed in a maneuver necessitating a change in the attitude of the engine to alter the course of the aircraft, the air intake lip member 14 and the spike member 16' are moved to align with the direction of incoming air as shown in Fig. 6.

Movements of the air intake lip member 14 and spike member 16 are preferably performed simultaneously. However, such movement may be effected in either one of the two ways shown by the diagrams in Figs. 7 and 8.

As shown in Fig. 7, the inlet edge 21 of the air intake lip member 14 is moved directly from its zero position X to the final position Z by jointly operating all of the actuators 33 in a manner to produce such movement. For example, the two actuators disposed at 6 o'clock and 9 o'clock are retracted while the actuators 33 disposed at 12 o'clock and 3 o'clock are extended an equal amount. In a similar manner, the spike member 16' is moved directly to the final position Z by retracting the two actuators 41 disposed at 6 o'clock and 9 o'clock and extending the two actuators 41 disposed at 12 o'clock and 3 o'clock.

The inlet edge 21 of the air intake lip member 14 and the spike member 16' may also be moved from their zero position X to their final position in two separate successive steps X to Y, and Y to Z (Fig. 8) by extending the actuator 33 at 12 o'clock and retracting the actuator at 6 o'clock a like amount and subsequently retracting actuator 33 at 9 o'clock and extending the actuator at 3 o'clock a similar amount. In like manner, the spike member 16' may be moved in two separate steps X to Y and Y to Z.

The spike member 16' may be axially retracted or extended by the actuator 38 to cater to varying supersonic flight speeds attained by the engine, thereby insuring that the shock wave S, S is continuously anchored to the peripheral edge 21 of the lip member 14.

The above sequence and direction of movement is merely exemplary, since the exact degree and direction of movement is determined by the magnitude of the angle of attack and its orientation.

Figures 9, 10:
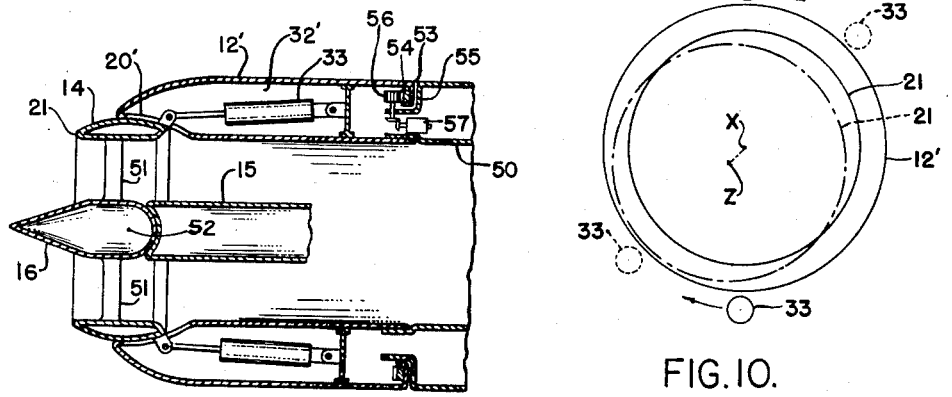
Fig. 9 is a view similar to Fig. 5 but showing a further embodiment.
Fig. 10 is a diagrammatic view illustrating the mode of operation of the embodiment shown in Fig. 9.

In Fig. 9 there is shown a further embodiment in which the air inlet structure for an aviation engine is provided with a forwardly disposed double walled casing structure 12' defining an annular chamber 32' and rotatably supported by and in registry with a rear tubular casing structure 50. The air intake lip member 14 is slidably received within the mating concave spherical surface portion 20' of the forward casing portion 12', in a manner similar to that described in conjunction with the other embodiments, and the spike member 16 is movably supported at its rear end by the centrally disposed core member 15, in the manner previously described. However, in this instance, the spike member 16 is rigidly attached to the air intake lip member 14 by a plurality of struts 51, so that the air intake lip member 14 and the spike member 16 are unitary and movable as a unit. A pair of actuators 33, disposed 180° apart (as indicated in Fig. 10) within the annular chamber 32' serve to rotate the air intake lip member 14 and the spike member 16 about an axis 52 disposed normal to the axis of the engine.

The forward casing 12' has an inturned annular flange 53 to which is attached a ring gear 54. The rear casing 50 is provided with a Z-shaped annular flange 55 extending forwardly of the flange 53 and encompassed by the latter. The flange 55 is provided with a driving pinion 56 disposed in meshing relation with the ring gear 54 and driven by a suitable reversible motor 57. Thus, it will be seen that the casing 12' is rotatable axially relative to the casing 50 by energization of the motor 57.

When it is desired to position the inlet edge 21 of the intake lip member 14 and the spike member 16 into a zero angle of attack relation with the incoming air during a maneuver as heretofore described, the motor 57 is energized (by means not shown) to drive the pinion 56 and the associated ring gear 54 in either direction. Accordingly, the casing 12' is rotated about its axis, for example, in the direction indicated by the arrows in Fig. 10. Concurrently therewith, the actuators 33 (which have been moved to the dotted line position with the casing) are actuated to angularly position the spike member 16 and the inlet edge 21 of the intake lip 14. With this arrangement only one pair of actuators 33 is required, since they are in effect rotated by the motor 57 to a position in which a simple angular movement of the air intake lip 14 and spike member 16 is needed to move the same from the zero position at X to the final position at Z.

It will now be seen that the invention provides an air inlet structure for an aviation jet engine which is highly versatile in nature and adaptable to any flight maneuver of the engine to provide the maximum air intake efficiency for the engine regardless of the angle of attack of the engine relative to the direction of air flow.

It will further be seen that the invention provides an air intake lip and spike member arranged for joint or concomitant motion to eliminate air intake losses incurred by the angle of attack of the engine.

Although the system for controlling the actuators which regulate the air intake lip and the spike member has not been shown, any suitable system may be provided for effecting the same. For example, the system may be a simple mechanical or electrical system actuated by the pilot during maneuvering or it may be an automatic system of any desired type having suitable means for sensing the angle of attack of the engine and operable to maintain the intake lip and spike structure at zero angle of attack regardless of the attitude of the engine.

Although in Fig. 9 the spike member 16 has been illustrated as connected to the air intake lip member 14 to form a unitary structure, it will be understood that if desired, the structure shown in Figs. 5 and 6 may be modified in a similar manner, thereby eliminating the actuators 41 for separately operating the spike member 16', or conversely, the struts 51 may be omitted from Fig. 9 and actuators may be provided within the core member 15 for separately actuating the spike member 16.

In like manner although the spike member 16' of Figs. 5 and 6 has been shown as of the axially movable type to cater to various supersonic flight speeds of the engine, such mechanism may be eliminated therefrom to provide the simple spike member 16 illustrated in Figs. 3, 4 and 9, or conversely the spike member 16 illustrated in Fig. 9 may be modified to permit fore and aft actuation as illustrated in Figs. 5 and 6.

While the invention has been shown in several forms, it will be obvious to those skilled in the art that it is not so limited, but is susceptible of various other changes and modifications without departing from the spirit thereof.

What is claimed is:

1. An air inlet structure for a supersonic aircraft jet propulsion engine comprising a tubular casing structure having a forwardly-disposed peripheral edge portion and defining the outer periphery of an axially extending air passageway, an annular air intake lip member disposed in registry with said casing structure adjacent said peripheral edge portion, a substantially conical spike member disposed substantially centrally in said lip member and operable to reflect supersonic shock waves against said lip member, means for supporting said spike member and said lip member for universal angular movement relative to said casing structure, and actuator means for concomitantly moving said spike and said lip member into alignment with the flow of incoming air.

2. An air inlet structure for an aircraft jet propulsion engine having supersonic flight speed characteristics comprising a tubular casing structure having a forwardly-disposed peripheral edge portion and defining the outer periphery of an axially extending air passageway, an annular air intake lip member disposed in registry with said casing structure adjacent said peripheral edge portion, a substantially conical spike member disposed substantially centrally in said lip member and operable to reflect supersonic shock waves against said lip member, means for supporting said lip member for universal angular movement relative to said casing structure including a first spherical surface portion provided on said casing structure adjacent the edge portion, and a second spherical portion provided on said lip member, said spherical surface portions slidably mating with each other and having their centers of revolution on the central axis of said casing structure, and actuator means for concomitantly moving said spike and said lip member into alignment with the flow of incoming air.

3. An air inlet structure for an aircraft jet propulsion engine having supersonic flight speed characteristics comprising a tubular casing structure having a forwardly disposed peripheral edge portion and defining the outer periphery of an axially extending air passageway, an annular air intake lip member disposed in said casing structure adjacent said peripheral edge portion, a pointed spike member disposed substantially centrally in said lip member and operable to reflect supersonic shock waves against said lip member, means for supporting said spike member for universal angular movement relative to said casing structure including a core member disposed on the central axis of said casing structure and together therewith imparting an annular shape to the air passageway, and further including a concave spherical surface portion and a mating convex spherical surface portion received therein, one of said spherical surface portions being provided on said spike member and the other of said spherical surface portions being provided on said core member, means for supporting said lip member for universal angular movement relative to said casing structure, and actuator means for concomitantly moving said spike and said lip member into alignment with the flow of incoming air.

4. An air inlet structure for admitting air at supersonic velocity to an aircraft jet propulsion engine comprising a tubular casing structure having a forwardly disposed peripheral edge portion and a rearwardly disposed peripheral portion jointly defining the outer periphery of an axially extending air passageway, an annular air intake lip member disposed in registry with said casing structure adjacent said peripheral edge portion, a substantially conical spike member disposed substantially centrally in said lip member and operable to reflect supersonic shock waves against said lip member, means for supporting said lip member for universal angular movement relative to at least one portion of said casing structure, means including a plurality of struts connecting said lip member and said spike member to provide a unitary structure, and actuator means for moving said unitary structure into alignment with the flow of the incoming air.

5. An air inlet structure for a supersonic aircraft jet propulsion engine comprising a tubular casing structure having a forwardly disposed peripheral edge portion and a rearwardly disposed peripheral portion jointly defining the outer periphery of an axially extending air passageway, an annular air intake lip member disposed in registry with said casing structure adjacent said peripheral edge portion, a pointed spike member disposed substantially centrally in said lip member and operable to reflect supersonic shock waves against said lip member, means for supporting said lip member for universal angular movement relative to at least one portion of said casing structure, means including a plurality of struts connecting said lip member to said spike member to provide a unitary structure, and means including an actuator for moving said unitary structure, said casing structure comprising spaced inner and outer tubular wall structure defining an annular chamber and said actuator being disposed in said chamber.

6. An air inlet structure for a supersonic aircraft jet propulsion engine comprising a first tubular casing structure having a forwardly disposed peripheral edge portion, a second tubular casing structure in axial alignment with said first casing structure, means for rotatably supporting said first casing structure on said second casing structure, first actuator means for rotating said first casing structure, an annular air intake lip member disposed in registry with said first casing structure adjacent said peripheral edge portion, a substantially conical spike member substantially centrally disposed in said lip member and operable to reflect supersonic shock waves against said lip member, means for supporting said spike member and said lip member in said first casing structure for joint and pivotal movement about an axis normal to the axis of said first casing structure, and a second actuator means for concomitantly moving said spike member and said lip member about said axis to maintain the shock waves in anchored relation with said lip member.

7. An air inlet structure for a supersonic aircraft jet propulsion engine comprising a tubular casing structure having an inner peripheral wall defining the outer periphery of an axially extending air passageway and an outer peripheral wall defining together with the inner wall an annular chamber, said inner and outer walls being connected adjacent their forward edge portions, an annular air intake lip member nested in said casing structure, said intake lip member having a peripheral marginal portion extending forwardly of said casing structure, a substantially conical spike member disposed centrally of said lip member and having a forwardly converging surface portion extending axially beyond said lip member, whereby said spike member is operable to reflect supersonic shock waves against said lip member, means for pivotally supporting said spike member and said lip member for universal movement relative to said casing structure, first actuator means disposed within said chamber for moving said lip member and second actuator means disposed within said spike member supporting means for moving said spike member, said first and second actuator means being operable to concomitantly move said spike member and said lip member to maintain the shock waves in anchored relation with said lip member.

8. An air inlet structure for admitting air at supersonic velocity to an aircraft jet propulsion engine comprising a tubular casing structure having an inner peripheral wall defining the outer periphery of an axially extending air passageway and an outer peripheral wall defining together with the inner wall an annular chamber, said inner and outer walls being connected adjacent their forward edge portions, an annular air intake lip member nested in said casing structure, said intake lip member having a peripheral marginal portion extending forwardly of said casing structure, a spike member disposed centrally of said lip member and having a forwardly converging surface portion of substantially conical shape extending axially beyond said lip member, whereby said spike member is operable to reflect supersonic shock waves against said lip member, means for pivotally supporting said spike member and said lip member for angular movement relative to said casing structure, first actuator means disposed within said chamber for moving said lip member, second actuator means disposed within said spike member supporting means for moving said spike member, said first and second actuator means being operable in unison, whereby to concomitantly move said spike member and said lip member, means for slidably supporting the converging portion of said spike member for movement in axial direction and third actuator means for moving said converging portion.

References Cited in the file of this patent

UNITED STATES PATENTS

| | | |
|---|---|---|
| 1,645,747 | Fry | Oct. 18, 1927 |
| 2,475,786 | Jordan | July 12, 1949 |
| 2,631,425 | Nordfors | Mar. 17, 1953 |
| 2,638,738 | Salter | May 19, 1953 |
| 2,776,806 | Brendal | Jan. 8, 1957 |